Figures 1, 2:
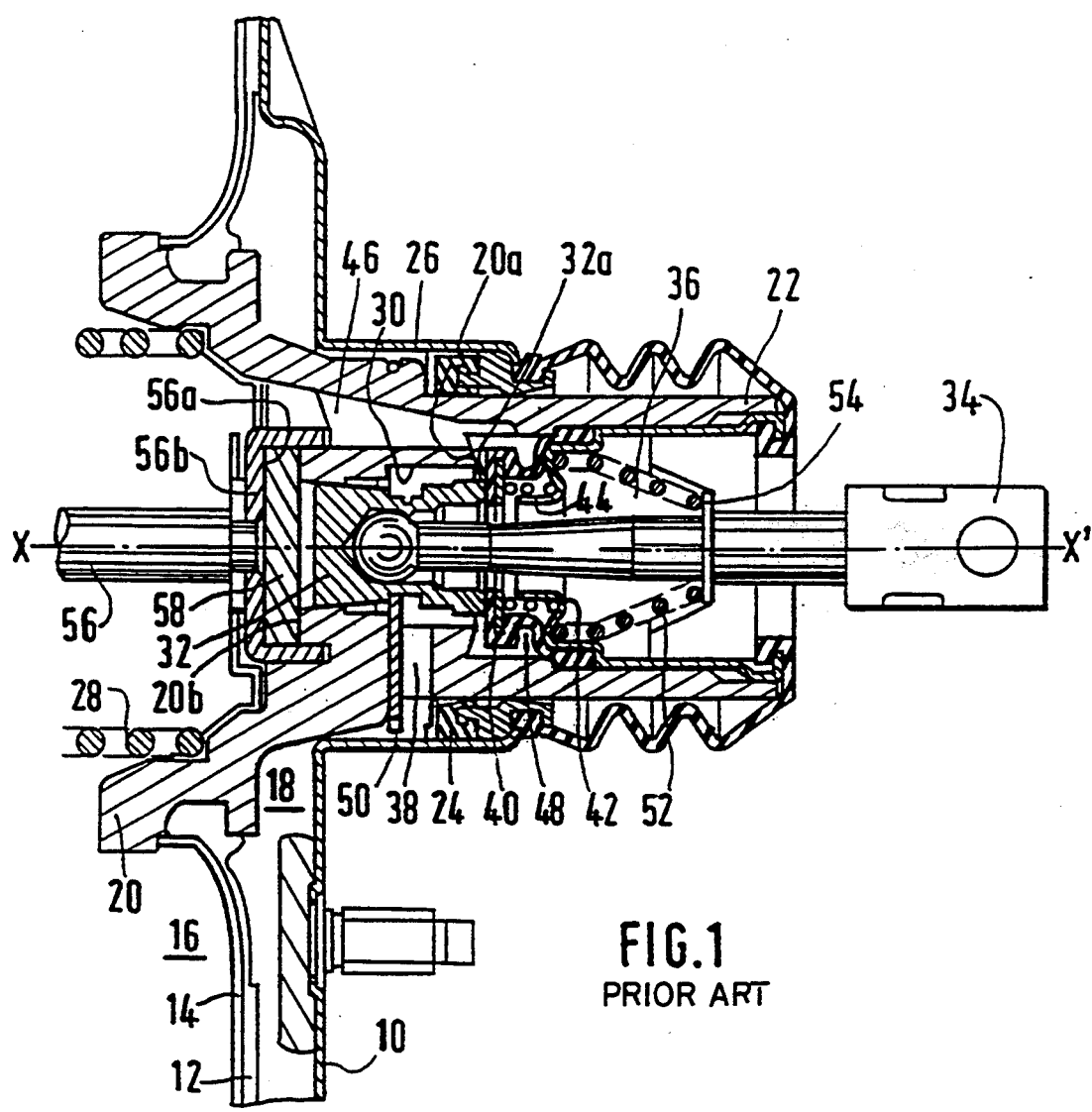

United States Patent [19]

Levrai et al.

[11] Patent Number: 5,425,302
[45] Date of Patent: Jun. 20, 1995

[54] PNEUMATIC BOOSTER

[75] Inventors: Roland Levrai, Stains; Philippe Castel, Paris; Pascal Le Normand, Aulnay-Sous-Bois, all of France

[73] Assignee: Bendix Europe Services Techniques, Drancy, France

[21] Appl. No.: 90,059

[22] PCT Filed: May 25, 1993

[86] PCT No.: PCT/FR93/00501
§ 371 Date: Jul. 30, 1993
§ 102(e) Date: Jul. 30, 1993

[87] PCT Pub. No.: WO93/24352
PCT Pub. Date: Dec. 9, 1993

[30] Foreign Application Priority Data

May 26, 1992 [FR] France .................. 92 06398

[51] Int. Cl.⁶ ............................................. F15B 9/10
[52] U.S. Cl. .............................. 91/369.2; 91/376 R
[58] Field of Search ................ 91/369.2, 376 R; 92/98 R, 99

[56] References Cited

U.S. PATENT DOCUMENTS 3,470,697 10/1969 Pech et al. .
4,719,842 1/1988 Gautier ........................ 91/376 R X
4,892,027 1/1990 Wagner et al. ................. 91/369.2
4,898,073 2/1990 Seip et al. ....................... 91/369.2
5,054,370 10/1991 Osterday et al. .
5,146,837 9/1992 Inoue ............................. 91/369.2
5,261,313 11/1993 Yared ........................ 91/369.2 X

FOREIGN PATENT DOCUMENTS 3601769 7/1987 European Pat. Off. .
0259063 3/1988 European Pat. Off. .
0341101 8/1989 European Pat. Off. .
2074270 10/1981 United Kingdom ........... 91/369.2

Primary Examiner—Edward K. Look
Assistant Examiner—Hoang Nguyen
Attorney, Agent, or Firm—Larry J. Palguta; Leo H. McCormick, Jr.

[57] ABSTRACT

The invention relates to a pneumatic brake-booster comprising a casing (10) inside which is a piston formed of a back tubular part (22) supporting a skirt (14) and which, with the aid of an unrolling membrane (12), defines a front chamber (16) connected permanently to a source of partial vacuum and a back chamber (18) connected selectively to the front chamber (16) or to the atmosphere via a valve (40) actuated by a control rod (34) capable of bearing, through the intermediary of the front face of a plunger (32), on a first face of a reaction disk (58) securely attached through a second face to a thrust rod (56). According to the invention, the piston (20) bears against the reaction disk (58) through a resilient annular front face (68, 68').

13 Claims, 4 Drawing Sheets

PNEUMATIC BOOSTER

The present invention relates to pneumatic boosters, and more particularly those of the type used in order to boost the braking of motor vehicles.

Boosters of this type conventionally comprise a piston comprising a back tubular part and a skirt and which, with the aid of an unrolling membrane, defines a front chamber connected permanently to a source of partial vacuum and a back chamber connected selectively to the front chamber or to the atmosphere via a valve means actuated by a control rod capable of bearing, through the intermediary of the front face of a plunger, against a first face of a reaction disk securely attached through a second face to a thrust rod.

Such boosters, as illustrated for example by document EP-A-0,101,658, have various disadvantages. Thus for example, in normal operation, that is to say in boost phase, the plunger controls the valve means, the latter comprising a valve interacting through an active part with a first valve seat formed on the plunger and with a second valve seat formed on the piston, so as to admit a certain quantity of air into the back chamber, as a function of the force exerted by the driver of the vehicle on the control rod. The difference in the pressures exerted on the two faces of the skirt of the piston then creates a boost force, itself also a function of the force exerted on the control rod.

A moment arrives however when the control force, otherwise termed input force, is strong enough for the pressure in the back chamber to be equal to the atmospheric pressure. The booster is then in saturation phase, that is to say the difference in pressure between back chamber and front chamber has reached its maximum. Whatever the force exerted by the driver on the control rod, this pressure difference can no longer increase and the boost force remains constant, and any additional input force results in the same increase in the output force on the thrust rod. There is therefore an abrupt transition between the boost phase and the saturation phase, during which the boost force, which was increasing linearly with the input force, becomes constant. This transition from one phase to the other is perceived by the driver as an abrupt rise in the force to be exerted in order to obtain in the saturation phase the same increase in the output force as during the boost phase.

The object of the present invention is consequently to provide a booster whose operation does not exhibit any abrupt transition from the boost phase to the saturation phase.

According to the present invention, the piston bears against the reaction disk through a resilient annular front face.

According to advantageous features of the invention, this annular front face is resiliently deformable between a rest position and an active position, which is obtained when the thrust rod exerts on the reaction disk a force greater than a predetermined value. Advantageously, an intermediate resilient member is disposed between the annular front face of the piston and the plunger, this intermediate resilient member coming into contact with the plunger and the annular front face of the piston when the latter is in its active position.

According to other particularly advantageous features, the annular front face of the piston and the intermediate resilient member comprise radial sectors, so that the transition from the boost phase to the saturation phase is adjustable.

Figure 3:
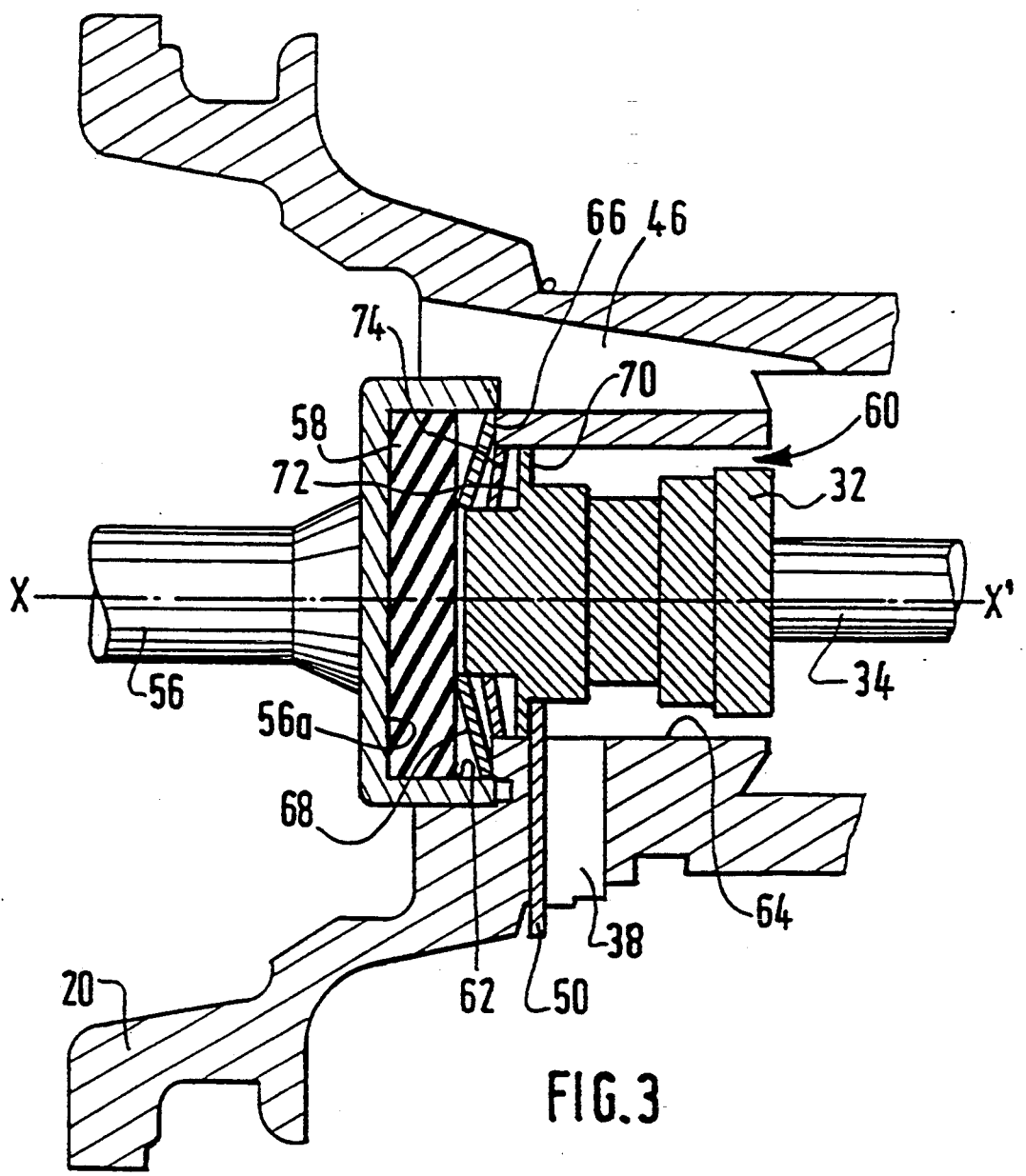
Figure 4:
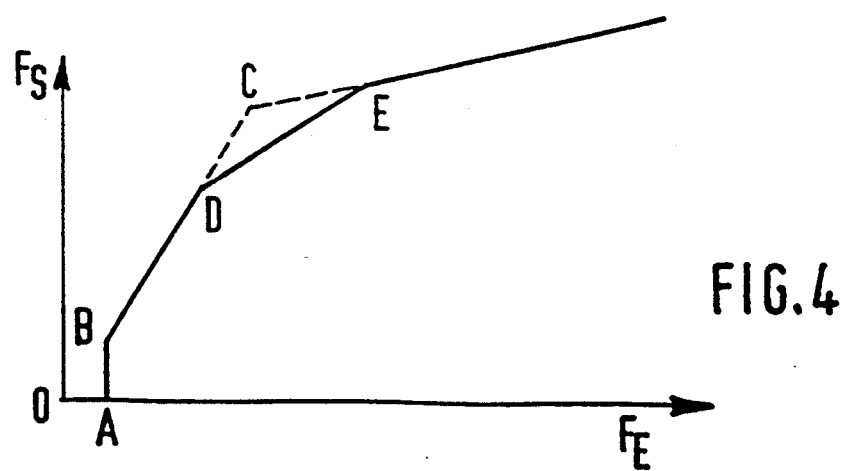
Figure 5:
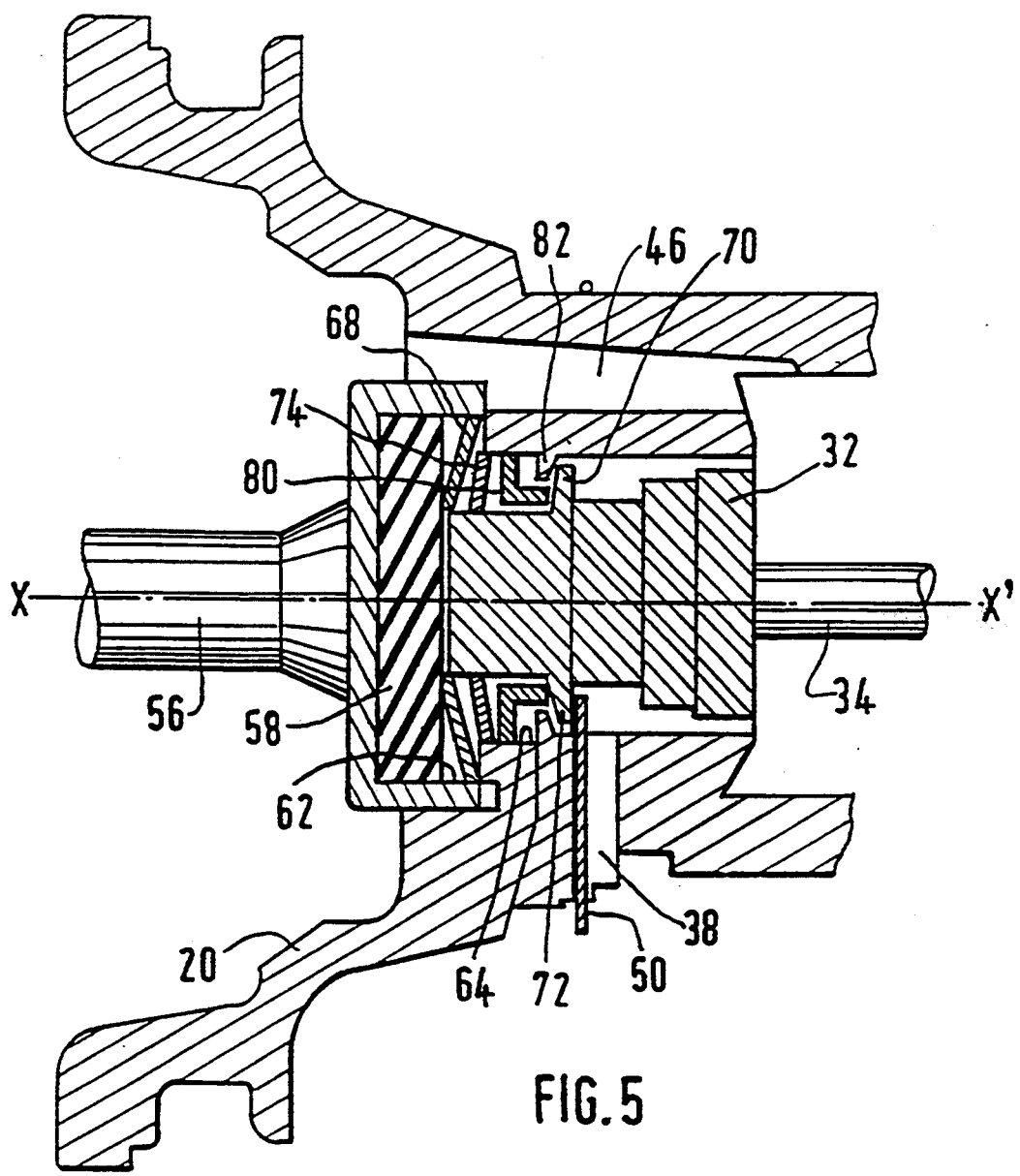

The invention will now be described by way of example with reference to the accompanying drawings in which:

FIG. 1 is a side view, in longitudinal section, showing the back central part of a pneumatic brake-booster of the type known, for example, from the above-mentioned document, FIG. 2 is a curve showing diagrammatically the development of the force Fs exerted on the thrust rod at the booster output as a function of the force Fe exerted on the control rod at the booster input, FIG. 3 is a side view in longitudinal section, showing the back central part of a pneumatic brake-booster according to one embodiment of the invention, FIG. 4 is a curve showing diagrammatically the development of the force Fs exerted on the thrust rod at the output of the booster of FIG. 3 as a function of the force Fe exerted on the control rod, and FIG. 5 is a side view in longitudinal section showing a variant of the embodiment of FIG. 3.

Figure 9:
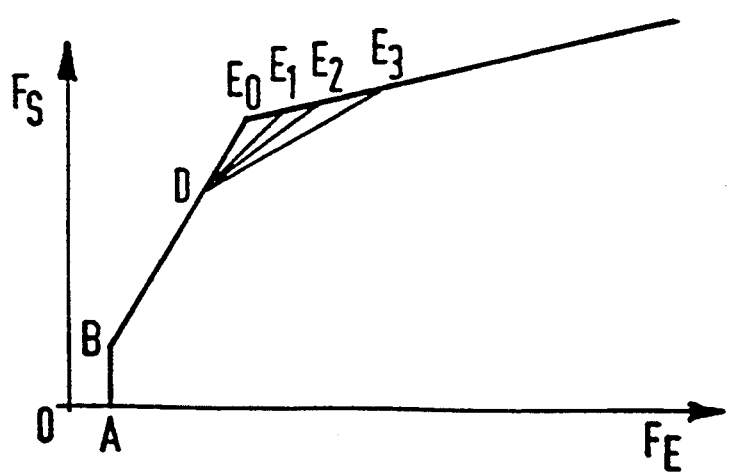
Figure 6:
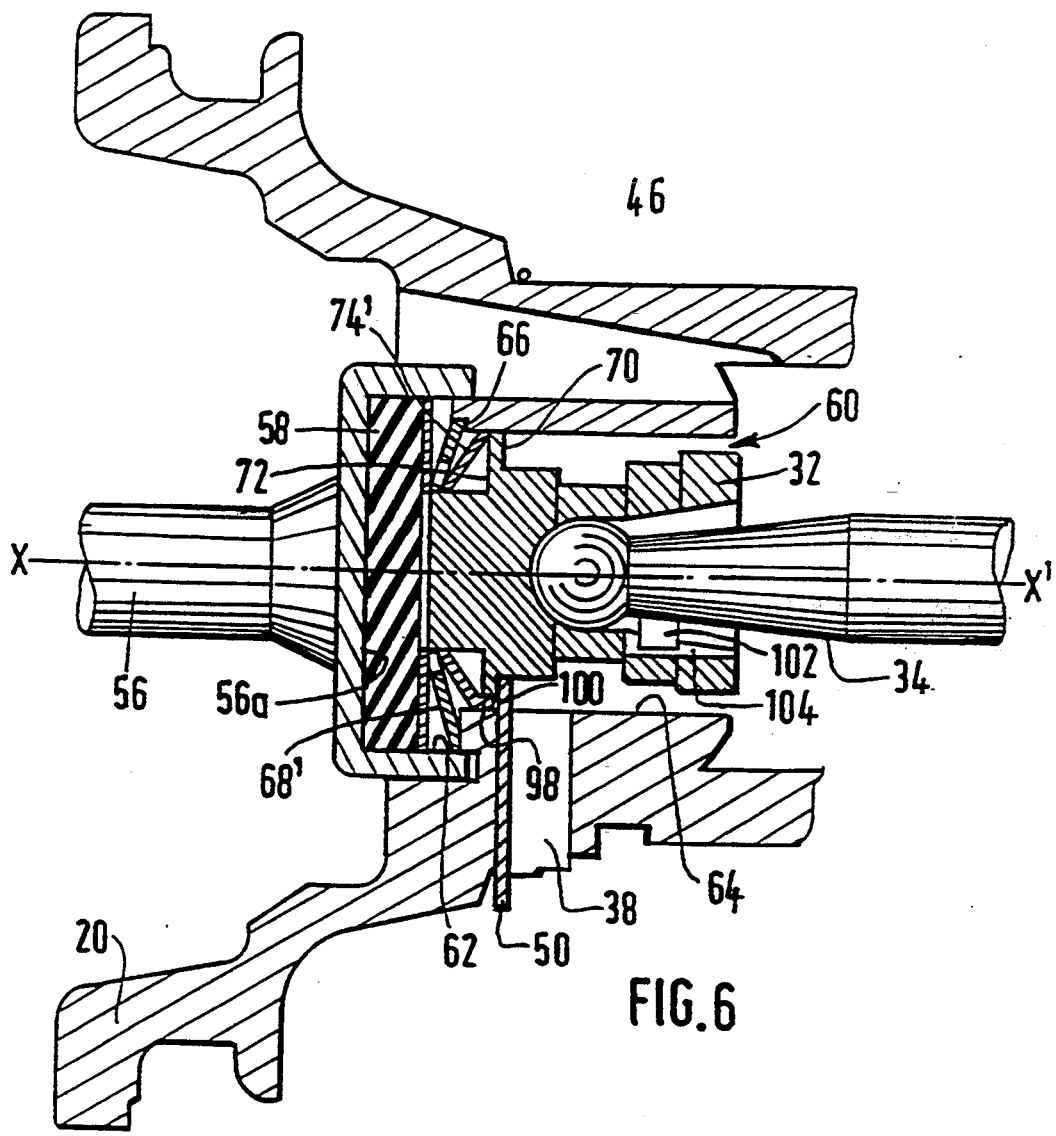
Figure 7:
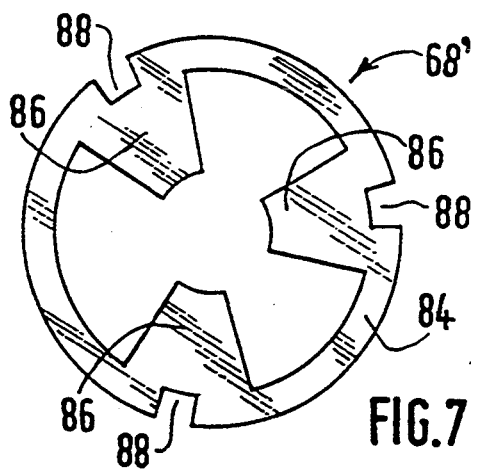
Figure 8:
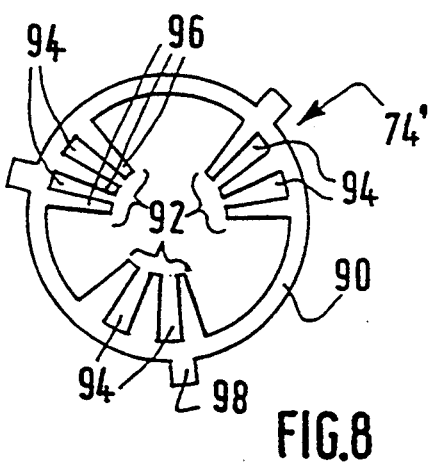

FIG. 6 is a side view in longitudinal section showing a variant of the embodiment of FIG. 3, FIGS. 7 and 8 are plan views of springs usable in the booster shown in FIG. 6, and FIG. 9 is a network of curves showing diagrammatically the changes in the force $F_S$ exerted on the thrust rod at the output of the booster of FIG. 6 as a function of the Force $F_E$ exerted on the control rod at the input of the booster.

FIG. 1 shows part of a brake-booster designed to be placed in the usual manner between the brake pedal of a vehicle and the master cylinder controlling the hydraulic brake system of this vehicle. By convention, the part of the booster turned towards the master cylinder is termed front and the part of the booster turned towards the brake pedal is termed back.

The booster of FIG. 1 comprises a shell-shaped outer casing 10, having a symmetry of revolution about an axis X–X'. Only the back central part of this casing 10 is shown in FIG. 1.

A supple unrolling membrane 12 of elastomer, reinforced in its central part by a metal support disk 14 otherwise termed skirt, defines inside the space delimited by the casing 10 a front chamber 16 and a back chamber 18. The outer peripheral edge (not shown) of the membrane 12 is attached in a leaktight manner onto the outer casing 10. The inner peripheral edge of this same membrane terminates in a bead received in leaktight manner in an annular groove formed on the outer peripheral surface of a hollow booster piston 20 disposed along the axis X–X' of the booster. This hollow piston 20 extends backwards in the form of a tubular part 22 which passes in leaktight manner through the back wall of the casing 10. The leaktightness of this passage is ensured by a reinforced annular seal 24 which is fixed by a ring 26 into a tubular central part extending backwards the back wall of the casing 10.

A compression spring 28 interposed between the piston 20 and the front wall (not shown) of the outer casing 10 normally retains the piston 20 and the skirt 14 in a backward rest position shown in FIG. 1, in which the back chamber 18 has its minimal volume and the front chamber 16 its maximal volume.

In its central part situated between the tubular back part 22 and the front part in which are fixed the membrane 12 and the skirt 14, the piston 20 has a bore 30 in which is slideably received a plunger 32 also having a symmetry of revolution about the axis X-X'. The front end of a booster control rod 34, also disposed along the axis X-X', is mounted in the manner of a ball joint in the plunger 32. The back end of this rod 34, which projects outside the tubular part 22 of the piston 20, is controlled directly by the brake pedal (not shown) of the vehicle.

The annular space 36 delimited between the control rod 34 and the tubular part of the piston 20 opens to the outside atmosphere at the back of the booster, for example through the intermediary of an air filter. Towards the front, this same annular space can communicate with the back chamber 18 through a radial passage 38 formed in the central part of the piston, when the boost means controlled by the plunger 32 are actuated.

In conventional manner, these boost means comprise a three-way valve comprising an annular valve 40 mounted in the tubular part of the piston and two annular valve seats 20a and 32a formed on the central part of the piston 20 and on the plunger 32 respectively.

The valve 40 constitutes the front end, of smaller diameter, of a supple sleeve of elastomer whose back end terminates in a bead mounted in a leaktight manner inside the tubular part 22 of the piston 20. This bead is held in place by a metal cup 42, against which bears a compression spring 44 tending to move the valve 40 forwards.

The annular valve seat 32a is formed on the back end face of the plunger 32. In a comparable manner, the annular valve seat 20a is formed on the back end face of the central part of the piston 20, around the seat 32a. Depending on the position of the plunger 32 inside the piston 20, this arrangement permits the valve 40 to bear constantly in a leaktight manner against at least one of the valve seats 32a and 20a under the action of the spring 44.

A second passage 46 is formed in the central part of the piston 20, approximately parallel with its axis X-X', so as to cause the front chamber 16 of the booster to communicate with an annular chamber 48 formed around the valve 40, inside the tubular part 22 of the piston 20. When the plunger 32 occupies its backward rest position shown in FIG. 1, in which the valve 40 bears in a leaktight manner against the seat 32a of the plunger 32 and is separated from the seat 20a of the piston 20, the front chamber 16 and back chamber 18 of the booster thus communicate with one another via the passage 46, the annular chamber 48 and the passage 38.

In a manner also conventional per se, at least one stop member 50 mounted in the central part of the piston 20 delimits the axial travel of the plunger 32 inside the latter. The plunger 32 is normally retained in the backward rest position defined by the member 50 by means of a compression spring 52 interposed between the cup 42 and a washer 54 itself bearing against a step formed on the control rod 34.

In its central part, the piston 20 comprises an annular front face 20b at the centre of which opens the bore 30. This annular front face 20b of the piston 20 acts on a back face 56b of a thrust rod 56, through a reaction disk 58 in a deformable material such as an elastomer. More precisely, the thrust rod 56 and the reaction disk 58 are disposed along the axis X-X' of the booster, in the extension of the control rod 34 and of the plunger 32. The back surface 56a of the thrust rod 56 is formed on a disk-shaped plate 56b constituting the back end of the rod 56.

The operation of this known booster is conventional and can be described succinctly in the following manner.

When the booster is installed in a vehicle, the front chamber 16 communicates permanently with a vacuum source.

In a first stage, the depressing of the brake pedal by the driver has the effect of equalling the prestress load of the spring 52 less the prestress load of the spring 44. During this slight displacement of the control rod 34 and of the plunger 32, the valve 40, under the action of the spring 44, follows the seat 32a of the plunger 32, until it comes into contact with the seat 20a of the piston; the front chamber 16 and back chamber 18 of the booster are then isolated from one another.

In this first phase of operation of the booster which corresponds to the segment 0A in FIG. 2, the force exerted on the control rod 34 does not generate any force on the thrust rod 56 at the booster output.

In a second phase of the brake actuation, corresponding to the segment AB in FIG. 2, the plunger 32 is moved sufficiently forwards for the valve 40 to be in leaktight contact with the seat 20a of the piston and to begin to move away from the seat 32a of the plunger. Under these conditions, the back chamber 18 of the booster is isolated from the front chamber 16 and comes into communication with the atmosphere. A boost force is therefore created which tends to move the piston 20 forwards. This movement is transmitted to the thrust rod 56 by the reaction disk 48.

During this second phase of actuation of the brakes, the boost force exerted by the annular front face 20b of the piston 20 deforms progressively the reaction disk 58 until the latter totally fills the space which separates its back face from the front face of the plunger 32.

The output force Fs applied to the master cylinder by the thrust rod therefore increases abruptly up to the value corresponding to point B in FIG. 2, the segment AB representing the booster kick.

In a third phase of the actuation of the brake, which corresponds to segment BC in FIG. 2, any increase in the input force exerted by the driver on the control rod 34 generates an increase in the boost force exerted on the piston, which results in an increase in the reaction to the pedal exerted by the reaction disk 58 on the plunger 32.

Beyond point C in FIG. 2, otherwise termed saturation point, the pressure prevailing in the back chamber 18 of the booster is equal to the atmospheric pressure and an increase in the boost pressure is no longer possible. The increase in the output force exerted by the thrust rod 56 on the master cylinder is then approximately equal to the increase in the force exerted by the driver on the brake pedal. As can be seen in FIG. 2, the transition from the boosted phase of the booster represented by segment BC to the nonboosted phase represented beyond point C is accompanied by an abrupt change in the conditions in which the input force is converted into output force.

The precise purpose of the invention is to make the passing of the saturation point more gradual, by virtue of the device shown in FIG. 3. In this FIGURE, the members identical to those of FIG. 1 bear the same reference numbers.

It will be seen in FIG. 3 that the plunger 32 and the piston 20 have been slightly modified. The piston 20 is formed with a stepped bore 60 comprising a front part 62 of greater diameter and a back part 64 of smaller diameter, defining between them a step 66. The front part 62 has the same diameter as that of the reaction disk. An annular resilient washer 68, for example of the Belleville washer type, is disposed in the front part 62. This washer 68 has at rest the shape of a truncated cone having a given half-angle at the vertex, and whose concavity is, in the example shown, turned backwards. It has an outer peripheral edge of diameter equal to that of the reaction disk 58 and of the front part 62, and an inner peripheral edge of diameter slightly greater than that of the front face of the plunger 32. In the rest position of the booster shown in FIG. 3, where the plunger 32 bears against the stop member 50, the washer 68 bears at the same time against the step 66 and against the reaction disk 58.

The plunger 32 is formed with a radial extension 70 slideably received in the back part 64 of the bore 60, this radial extension having a step 72 turned forwards. The step 72 has an outer diameter slightly smaller than that of the back part 64 of the stepped bore 60. Between this step 72 and the annular resilient washer 68 is disposed an intermediate annular resilient washer 74. The intermediate resilient washer 74 has an outer peripheral edge of diameter equal to that of the step 72, and an inner peripheral edge of diameter slightly greater than that of the front face of the plunger 32. In the rest position shown in FIG. 3, this intermediate washer 74 is free to move between the washer 68 and the step 72.

The booster thus described operates in the following manner: at rest, the parts occupy the position shown in FIG. 3, the washer 68 bearing at the same time against the reaction disk 58 and against the step 66 of the piston 20, and the probe 32 being set back slightly with respect to the back face of the reaction disk 58. The distance between the front face of the plunger and the back face of the reaction disk determines, as was seen above, the value of the booster kick.

The phases of operation corresponding to the segments 0A and AB of FIG. 4 are identical to those of a conventional booster as have been explained with reference to FIG. 2. The only difference resides in that, in the boost phase, that is to say beyond point B in FIG. 4, the reaction disk 58 is in contact with the plunger 32, but also with the annular resilient washer 68. The boost force generated by the pressure differential on the two faces of the skirt 14 is transmitted through the piston 20, via the step 66, to the annular washer 68, and from there to the reaction disk 58. The annular washer 68 therefore performs the function of the annular front face 20b of the piston 20 of the booster of FIG. 1, in order to transmit the boost force from the piston 20 to the reaction disk 58 and the thrust rod 56.

In this manner, as can be seen in FIG. 4, for any increase in the input force Fe beyond point B there is a corresponding increase in the boost force generating an increased output force Fs. Since the boost force is transmitted from the piston 20 to the reaction disk 58 through the intermediary of the resilient washer 68, the latter will, in the course of this increase, itself support an increasing stress. It will thus become progressively deformed and will "flatten out", that is to say its half-angle at the vertex will tend towards 90°, that is to say again its inner peripheral edge will move closer to the step 72 formed on the plunger 32.

According to the invention, the resilient washer 68 is chosen so that, beyond a certain stress exerted on it, that is to say for a given boost force or else for an output force of predetermined value, it occupies an active position in which it comes into contact with the intermediate washer 74 and causes the latter to come into contact with the step 72 formed on the plunger 32. This output force of predetermined value corresponds to point D in FIG. 4.

Beyond point D in FIG. 4, it will be understood then that the plunger 32, and consequently the control rod 34, is subjected to the reaction exerted by the thrust rod 56 on the one hand through its front face, and on the other hand through its step 72 bearing against the intermediate washer 74 itself bearing against the resilient washer 68 whose entire front surface is in contact with the reaction disk 58. There is therefore an artificial increase in the area of the plunger 32 interacting with the reaction disk 58, and therefore a reduction in the amplification ratio of the booster. This then results in a boost phase where an increase in the input force generates an increase in the boost force less than that which took place before the washers 68 and 74 came into contact. Thus, as shown in FIG. 4, this results in a curve representing the variation in the output load in terms of the input load whose slope is less than that which existed previously, and which corresponds to the segment DE.

The operation of the booster continues under these conditions in proportion with the increase in the input load, until the pressure prevailing in the back chamber 18 of the booster is equal to the atmospheric pressure, at which moment saturation of the booster is reached. The booster operating curve then resumes the appearance which it had for a conventional booster, that is to say that which it had beyond point C in FIG. 2.

A booster is therefore seen to have been produced, according to the invention, the annular front face of whose piston, interacting with the reaction disk, is constituted by a resilient annular washer, which becomes deformed between a rest position and an active position when the output force, and correlatively the input force, exceeds a predetermined value, so as then to bring into play an intermediate resilient washer modifying the amplification ratio of the booster. In this manner, the passing of the saturation point is made more gradual, as can be seen in FIG. 4, where the passage through point C is avoided and replaced by the intermediate segment DE.

FIG. 5 shows a variant of the embodiment of FIG. 3. According to this variant, a rigid washer 80 has been interposed between the intermediate resilient washer 74 and the step 72 of the plunger. The booster constructed in this manner has an operation identical to that of FIG. 3, and will not be repeated in detail. During the boost phase corresponding to the segment BD of FIG. 4, the reaction disk 58 interacts with the front face of the plunger 32 and with the annular resilient washer 68 whereas the intermediate washer 74 and the rigid washer 80 are free of all stress. After the annular resilient washer 68 has become deformed, it comes to act upon the intermediate washer 74 which comes up against the rigid washer 80, itself bearing against the step 72 of the plunger. The operation is then in the reduced boost phase corresponding to the segment DE in FIG. 4.

The advantage of this embodiment resides in that it is possible to produce on the piston 20 a step 82 directed backwards. In normal operation, this step 82 performs no particular function. In the case of failure of the source of partial vacuum, where no boost can be provided by the booster, the step 72 of the plunger will come to interact with the step 82 of the piston so as to cause the latter to advance, and thus to make braking possible without damaging the booster.

FIG. 6 shows another variant of the embodiment of FIG. 3, which serves in an additional manner to adjust the gain of the booster of the invention, by varying the stiffness of the annular resilient washers disposed between the piston 20, the plunger 32 and the reaction disk 58.

To this effect, the resilient washer disposed towards the front has the shape of the washer 68' shown in plan-view in FIG. 7. The washer 68' has a peripheral ring 84, of outer diameter equal to that of the reaction disk 58, and sectors 86 extending radially inwards from this ring 84, and regularly distributed along the ring. These sectors 86 are truncated circularly at their tips, around a circle of diameter slightly greater than that of the front face of the plunger 32. Slots 88 are formed at the outer periphery of the ring 84, and are designed to interact with fingers 90 formed on the step 66 and extending forwards. The washer 68' is thus locked in rotation to the piston 20.

The intermediate resilient washer has the shape of the washer 74' shown in plan-view in FIG. 8. The washer 74' has a peripheral ring 90 of outer diameter equal to that of the step 72 of the plunger 32, and sectors 92 extending radially inwards from this ring 90, and regularly distributed along the ring. The sectors 92 are truncated circularly at their tips, around a circle of diameter slightly greater than that of the front face of the plunger 32.

Cut-outs 94 are made in the sectors 92 so that the latter are in fact formed of identical fingers 96 equal in number to the number of the cut-outs 94 plus one.

Lugs 98 are formed at the outer periphery of the ring 90, and are then bent back at substantially a right angle so as to extend axially backwards in order to enter slots 100 formed at the outer periphery of the step 72 of the plunger 32. The intermediate washer 74' is thus locked in rotation to the plunger 32.

Lastly, the control rod 34 is provided at its anterior end with a radial catch 102 entering a radial housing 104 formed in the plunger 32, so as to lock the control rod 34 and the plunger 32 together in rotation.

The sectors 86 and 92 have the same angle at the tip, and are equal in number n, greater than or equal to two (three in the example shown). The sectors 92 are identical to one another and comprise the same number m of fingers, greater than or equal to one (three in the example shown).

From the preceding explanations, it will have been understood that, on a totally assembled booster, by causing the control rod 34 to turn about its axis XX', the piston 20 remaining fixed in rotation in the booster, the relative angular positions of the washers 68' and 74' will be changed. Each sector 86 of the washer 68' may thus be in axial alignment with a variable number of fingers 96 of the washer 74', and even with none if the sectors 92 of the washer 74' are in axial alignment with the free spaces between the sectors 86 and the washer 68'. There are therefore m+1 possible relative angular positions between the washers 68' and 74' (four in the example shown).

The operation of the booster shown in FIG. 6 is identical to that of the booster shown in FIG. 3, and is represented diagrammatically by a curve of the type in FIG. 4. The operating phases corresponding to the segments OA and AB of FIG. 6 are identical to those of a conventional booster such as have been explained with reference to FIG. 2.

However, to each relative angular position of the washers 68' and 74' corresponds a characteristic curve. In fact, a change of the relative positions between the resilient washers 68' and 74' results in a change of the stiffness of the assembly.

As was seen above, the position of the point D in FIG. 9 is determined by the stiffness of the washer 68'. If the sectors 92 of the washer 74' are in axial alignment with the free spaces between the sectors 86 of the washer 68', once the latter has "flattened out", that is to say beyond the point D in FIG. 9, the washer 74' is inactive, and the operation of the booster corresponds to the segment $DE_o$, the point $E_o$ corresponding to the point C of FIG. 2. A booster of conventional operation is thus obtained.

However, depending on the number of fingers 96 of sectors 92 of the washer 74' in axial alignment with the sectors 86 of the washer 68', the stiffness of the washer 74' will be greater or less, and the operation of the booster will be expressed in the example shown, by the segments $DE_1$ if only one finger 96 is pushed, $DE_2$ if two fingers 96 are pushed, and $DE_3$ if the sectors 92 and 86 are in perfect axial alignment.

It will therefore be seen that on a booster totally assembled and installed on a vehicle, it is possible, by a simple operation, to select at will the saturation point transition mode, so that it corresponds to that of a conventional booster, or so that it is more or less progressive.

A device may be provided on the control rod 34 for indicating the angular position of the latter with respect to the piston 20, and more particularly with respect to the tubular back part 22 of the piston, as may a system for angular locking of the control rod 34 in the tubular part 22, permitting the operation of the mounting in the manner of a ball joint of the rod 34 in the plunger 32. The booster shown in FIG. 6 may also be constructed according to the variant of FIG. 5, that is to say with a rigid washer 80.

Of course, the invention is not limited to the embodiments which have been described, and is capable of receiving many variants which fall within its scope. Thus, for example, the reaction disk may be constructed with a concave back face, having a peripheral part in the shape of a truncated cone and a flat central part, so that, at rest, the resilient annular front face of the piston is in contact over its entire area with the reaction disk.

A rigid annular washer 106 may equally be disposed on the back face of the reaction disk, as shown in FIG. 6.

We claim:

1. A pneumatic brake-booster comprising a casing inside of which is a piston having a back tubular part supporting a skirt and which, with the aid of an unrolling membrane, defines a front chamber connected permanently to a source of partial vacuum and a back chamber connected selectively to one of the front chamber and or to atmosphere via valve means actuated by a control rod capable of bearing, through the intermediary of a front face of a plunger, against a first face of a reaction disk attached securely through a second face to a thrust rod, the piston bearing against the reaction disk through a resilient annular front face deformable between a rest position and an active position, the annular front face of the piston being placed in the active position when the thrust rod exerts on the reaction disk a force greater than a pre-determined value, characterized in that the resilient annular front face of the piston comprises an annular resilient washer bearing through an outer peripheral edge against a step of the piston and against the reaction disk, and an intermediate resilient member disposed between the annular front face of the piston and the plunger.

2. The booster according to claim 1, characterized in that the intermediate resilient member is in contact with the plunger and the annular front face of the piston when the piston is in the active position.

3. The booster according to claim 2, characterized in that the intermediate resilient member comprises a second annular resilient washer.

4. The booster according to claim 1, characterized in that the diameter of an inner peripheral edge of the annular resilient washer is slightly greater than that of the front face of the plunger, and in that the diameter of the outer peripheral edge of the annular resilient washer is equal to that of the reaction disk.

5. The booster according to claim 4, characterized in that the annular resilient washer comprises a peripheral ring and at least two sectors extending radially inwardly and truncated circularly at tips thereof.

6. Booster according to claim 5, characterized in that the annular resilient washer is locked in rotation to the piston.

7. The booster according to claim 3, characterized in that the second annular resilient washer comprises a peripheral ring and at least two sectors extending radially inwardly and truncated circularly at tips thereof.

8. The booster according to claim 7, characterized in that the second annular resilient washer is locked in rotation to the plunger.

9. The booster according to claim 8, characterized in that the plunger is locked in rotation to the control rod.

10. The booster according to claim 9, characterized in that at least one cut-out is made in each sector of the second annular resilient washer.

11. The booster according to claim 1, characterized in that the piston is formed with a stepped bore of which a front part of greater diameter receives the reaction disk and the annular resilient washer, and of which a back part of diameter smaller than that of the front part receives the intermediate resilient member and a radial extension of the plunger against which the intermediate resilient member comes into contact when the annular front face of the piston is in the active position.

12. The booster according to claim 11, characterized in that the radial extension of the plunger comprises a step which comes to bear against a rigid washer when the annular front face of the piston is in the active position.

13. The booster according to claim 11, characterized in that a rigid annular washer is disposed at the back face of the reaction disk.

* * * * *